(12) United States Patent
Lonij et al.

(10) Patent No.: US 10,594,817 B2
(45) Date of Patent: Mar. 17, 2020

(54) COGNITIVE DEVICE-TO-DEVICE INTERACTION AND HUMAN-DEVICE INTERACTION BASED ON SOCIAL NETWORKS

(71) Applicant: International Business Machines Corporation, Armonk, NY (US)

(72) Inventors: Vincent Lonij, Phoenix Park Racecourse (IE); Bradley Eck, Carpenterstown (IE); Amadou Ba, Marlborough Street (IE)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 15/724,838

(22) Filed: Oct. 4, 2017

(65) Prior Publication Data
US 2019/0104191 A1 Apr. 4, 2019

(51) Int. Cl.
*G06F 15/16* (2006.01)
*H04L 29/08* (2006.01)
(Continued)

(52) U.S. Cl.
CPC .......... *H04L 67/26* (2013.01); *G06F 17/2785* (2013.01); *G06Q 50/01* (2013.01); *H04L 67/12* (2013.01); *H04L 67/22* (2013.01)

(58) Field of Classification Search
CPC ......... H04L 67/26; H04L 67/12; H04L 67/22; G06Q 50/01
(Continued)

(56) References Cited

U.S. PATENT DOCUMENTS 5,293,584 A * 3/1994 Brown .................... G10L 15/18
704/200
5,992,737 A * 11/1999 Kubota ............. G06F 16/90344
235/380
(Continued)

FOREIGN PATENT DOCUMENTS

CN 105227430 A 1/2016
WO WO 2015/135160 A1 9/2015

OTHER PUBLICATIONS

List of IBM Patents or Patent Applications Treated as Related.
(Continued)

*Primary Examiner* — Thanh T Nguyen
(74) *Attorney, Agent, or Firm* — Scully, Scott, Murphy & Presser, P.C.; Kurt Goudy, Esq.

(57) ABSTRACT

A social network platform and method thereof for providing Internet of Things (I-o-T) devices with social behavior for communicating natural language (NL) text messages. An I-o-T device is provided with a social device application to form a unit capable of: reading free form NL messages, and responsively perform an action. The social device application generates NL text in response to reading a text message and/or in response to receiving readings from a set of sensors. Types of messages generated include messages for initiating social relationships with other devices which may communicate an acceptance/declination. The platform may be centralized with a server for ranking the importance of read messages based on the relationships and addressing NL text messages to other social units or groups of social units based on the relationships. The platform further enables direct messaging between social unit devices, brokering trust, and moderating information flow between devices.

10 Claims, 10 Drawing Sheets

(51) Int. Cl.
  *G06Q 50/00* (2012.01)
  *G06F 17/27* (2006.01)
(58) Field of Classification Search
  USPC .......................................................... 709/206
  See application file for complete search history.

(56) References Cited

U.S. PATENT DOCUMENTS

| | | | | |
|---|---|---|---|---|
| 6,041,323 | A * | 3/2000 | Kubota | G06F 16/3341 |
| 6,147,674 | A * | 11/2000 | Rosenberg | B25J 9/1689 |
| | | | | 345/157 |
| 6,502,064 | B1 * | 12/2002 | Miyahira | G06F 17/2735 |
| | | | | 341/106 |
| 8,745,194 | B2 * | 6/2014 | Uribe-Etxebarria Jimenez | ........ |
| | | | | G06Q 10/10 |
| | | | | 709/223 |
| 9,276,974 | B2 | 3/2016 | Sommer | |
| 9,904,675 | B2 * | 2/2018 | Kantor | G06F 17/2785 |
| 10,025,846 | B2 * | 7/2018 | Deshpande | G06F 16/288 |
| 10,269,076 | B1 * | 4/2019 | Ton-That | G06Q 40/08 |
| 2004/0243396 | A1 * | 12/2004 | Liu | G06F 17/2735 |
| | | | | 704/10 |
| 2006/0101102 | A1 * | 5/2006 | Su | G06F 16/358 |
| 2007/0038982 | A1 * | 2/2007 | Andrews | G06F 9/454 |
| | | | | 717/124 |
| 2008/0147325 | A1 * | 6/2008 | Maassel | G06T 17/05 |
| | | | | 702/5 |
| 2009/0150140 | A1 * | 6/2009 | Cohen | G06F 17/2755 |
| | | | | 704/9 |
| 2010/0325491 | A1 * | 12/2010 | Kumanan | G06F 8/74 |
| | | | | 714/38.1 |
| 2012/0066214 | A1 * | 3/2012 | Nelke | G06F 17/10 |
| | | | | 707/723 |
| 2012/0095619 | A1 * | 4/2012 | Pack | G05D 1/0038 |
| | | | | 701/2 |
| 2013/0091213 | A1 | 4/2013 | Diab et al. | |
| 2014/0129584 | A1 * | 5/2014 | Maple | H04L 67/16 |
| | | | | 707/760 |
| 2014/0250047 | A1 * | 9/2014 | Bounouane | G06N 7/005 |
| | | | | 706/52 |
| 2015/0254216 | A1 * | 9/2015 | DeLuca | G06F 17/2235 |
| | | | | 715/206 |
| 2016/0255186 | A1 * | 9/2016 | Kaneblai Martins Costa | ............ |
| | | | | H04M 1/72533 |
| | | | | 455/557 |
| 2017/0293834 | A1 * | 10/2017 | Raison | H04L 51/02 |
| 2018/0132422 | A1 * | 5/2018 | Hassanzadeh | G06Q 10/063 |
| 2018/0132423 | A1 * | 5/2018 | Rowan | A01G 22/00 |
| 2018/0181711 | A1 * | 6/2018 | Boland | G16H 40/67 |
| 2018/0181721 | A1 * | 6/2018 | Boland | G16H 80/00 |
| 2018/0181722 | A1 * | 6/2018 | Boland | G16H 40/67 |
| 2019/0124855 | A1 * | 5/2019 | Rowan | A01G 22/00 |

OTHER PUBLICATIONS

Anonymously, "System to Provide Users with Impromptu Conversation Summaries and Make Conversational Recommendations with an Emphasis on Personal Customizations with an Emphasis on Personal Customization, Based on Previous Conversations", IP.com, IP.com No. IPCOM000246660D, Jun. 24, 2016, pp. 1-5.

Anonymously, "System and Method to Automatically Identify Appropriate Social Network Recipients for a Post Based on Content and Prior User Behavior", IP.com, IP.com No. IPCOM000229415D, Jul. 28, 2013, pp. 1-2.

Motorola et al., "Experience Optimization in Social Networks", IP.com, IP.com No. IPCOM000194972D, Apr. 16, 2010, pp. 1-3.

Campos et al., "A peer-to-peer service architecture for the Smart Grid", Peer-to-Peer Computing (P2P), 14-th IEEE International Conference on, Sep. 8-12, 2014, pp. 1-5.

Chakraborty et al., "Distributed Service Composition Protocol for Pervasive Environments", Wireless Communications and Networking Conference, 2004, WCNC, 2004 IEEE, Mar. 21-25, 2004; pp. 2575-2580.

Gu et al., "SpiderNet: An Integrated Peer-to-Peer Service Composition Framework", High performance Distributed COmputing, 2004, Proceedings. 13th IEEE International Symposium on; Jun. 4-6, 2004, pp. 110-119.

Hu et al., "Distributed Automatic Service Composition in Large-Scale Systems", DEBS'08, Jul. 1-4, 2008, Rome, Italy, 12 pages.

Cremene et al., "Service Composition based on Natural Language Requests", Services Computing, 2009, SCC'09, IEEE International Conference on; Sep. 21-25, 2009, pp. 486-489.

Lemos et al., "Web Service Composition: A Survey of Techniques and Tools", ACM Computing Surveys, vol. 48, No. 3, Article 33, Dec. 2015; pp. 33:1-33:41.

* cited by examiner

COGNITIVE DEVICE-TO-DEVICE INTERACTION AND HUMAN-DEVICE INTERACTION BASED ON SOCIAL NETWORKS

FIELD

The present invention relates generally to systems and methods for enabling networked communications among devices, and particularly, cognitive devices for socially connecting Internet-of-Things enabled devices.

BACKGROUND

The Internet of things (I-o-T) is the inter-networking of physical devices, vehicles (also referred to as "connected devices" and "smart devices"), buildings, and other items embedded in everyday objects with electronics, software, sensors, actuators, and network connectivity which enable these objects to send, receive, collect and exchange data.

As the number of different devices connected to the Internet of things grows, the number of possible interactions between devices will grow exponentially.

It is the case that relying only on preprogrammed interactions does not scale to millions or billions of devices.

SUMMARY

A system, method and computer program product for enabling emerging behavior of collaboration between I-o-T devices.

A system, method and computer program product for enabling emerging behavior of collaboration between I-o-T devices that are not preprogrammed, including provision of a more flexible way of device to device communication in a social way.

A system, method and computer program product for enabling emerging behavior by providing I-o-T devices that enable communications messaging with a small set of social behaviors, e.g., follow, post, like, friend, that will enable scaling to billions of devices.

A system, method and computer program product for enabling emerging behavior that is not pre-programmed by providing I-o-T devices with the ability to generate messages that consist of free-form natural language (NL).

According to one embodiment, there is provided a method of communicating between two devices. The method comprises: at a first social processing unit, receiving sensor data from a sensor device; processing, at the first processing unit, the sensor device data and generating, in response to the sensor data received, a first message in a natural language (NL) format according to a pre-defined script; sending the generated first NL message over a communications network for receipt at one or more other devices, the one or more other devices configured to read NL format messages, and receiving, at the first social processing unit, a response message communicated from the one or more other devices, the response message generated in a natural language at the one or more other devices according to the pre-defined script.

In a further embodiment, there is provided a communications platform. The platform comprises: a communications network infrastructure supporting communication of messages; one or more social processing units configured to communicate over the communications network infrastructure, each having a hardware processor and configured to receive data from a sensor device or from an actuator device, a social processing unit generating, in response to received sensor data, a first message in a natural language (NL) format according to a pre-defined script; the social processing unit further configured to send the generated first NL message, over a communications network, for receipt at one or more other devices, and the social processing unit further configured to receive a response message communicated from the one or more other devices, the response message being generated in a natural language at the one or more other devices according to the pre-defined script.

In a further aspect, there is provided a computer program product for performing operations. The computer program product includes a storage medium readable by a processing circuit and storing instructions run by the processing circuit for running a method. The method is the same as listed above.

DETAILED DESCRIPTION

Figure 1A:
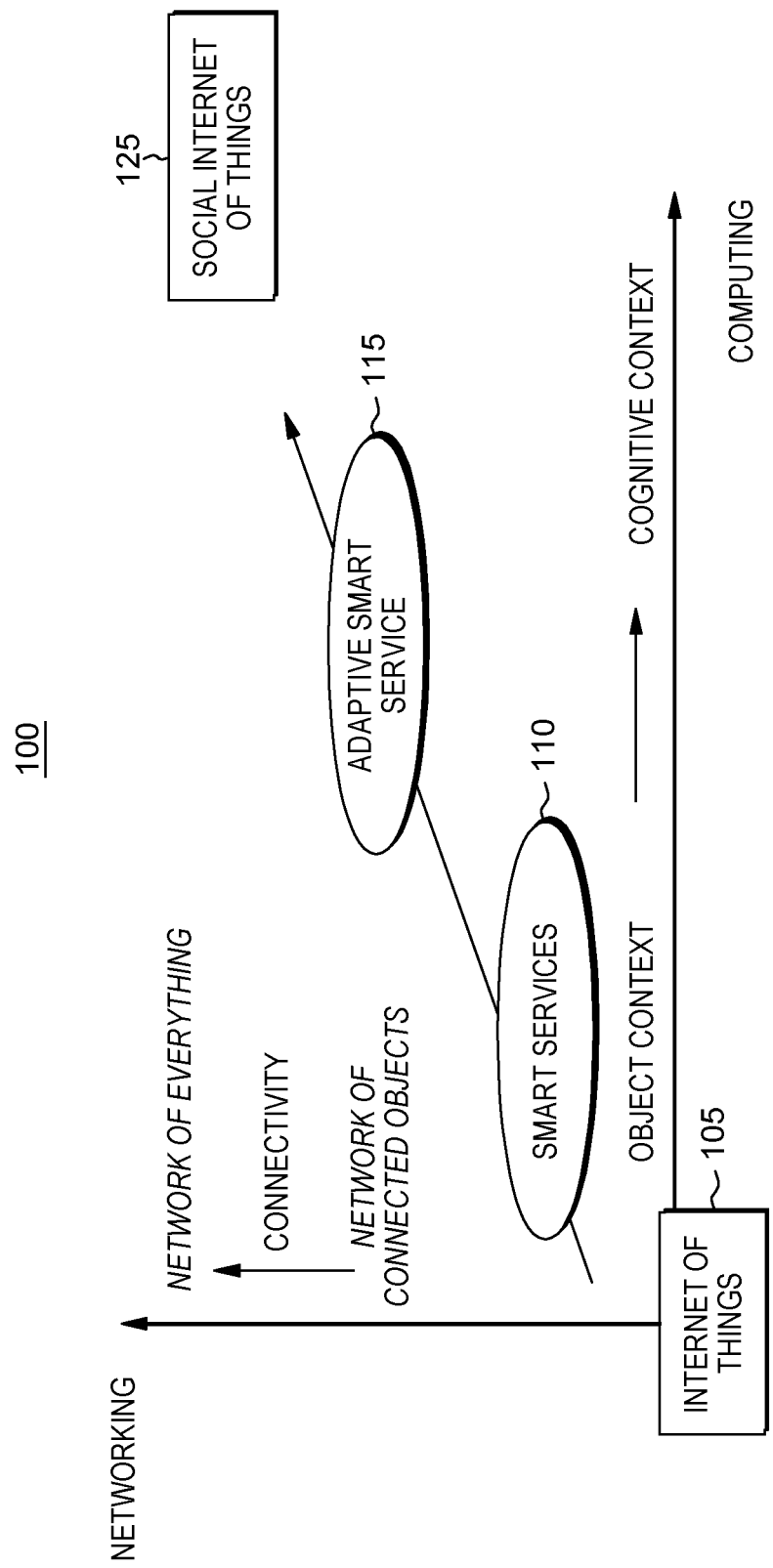
FIG. 1 generally depicts a concept depicting an evolution of a social Internet-of-things 100 according to an embodiment.

FIG. 1A is a conceptual depiction of an evolution of a social Internet-of-things plotted as a graph 100 according to an embodiment. In particular, In FIG. 1A, graph 100 depicts how the I-o-T (internet of things) devices 105 become a network of connected objects that ultimately forms a "network of everything". For example, the "Internet-of-Things" devices evolves into a Social Internet-of-Things as computing power increases, and objects become more "cognitive" in nature with object context evolving into a more "cognitive" context. Initially, this involves an evolution of an interconnection of I-o-T objects that provide "Smart Services" 110, and as the devices become more cognitive and connectivity increases, an evolution into an "Adaptive Smart Services" context 115 that will eventually result in a Social Internet of Things ("Social I-o-T") cognitive context 125 which is the ability for systems to communicate between them as humans do.

Figure 1B:
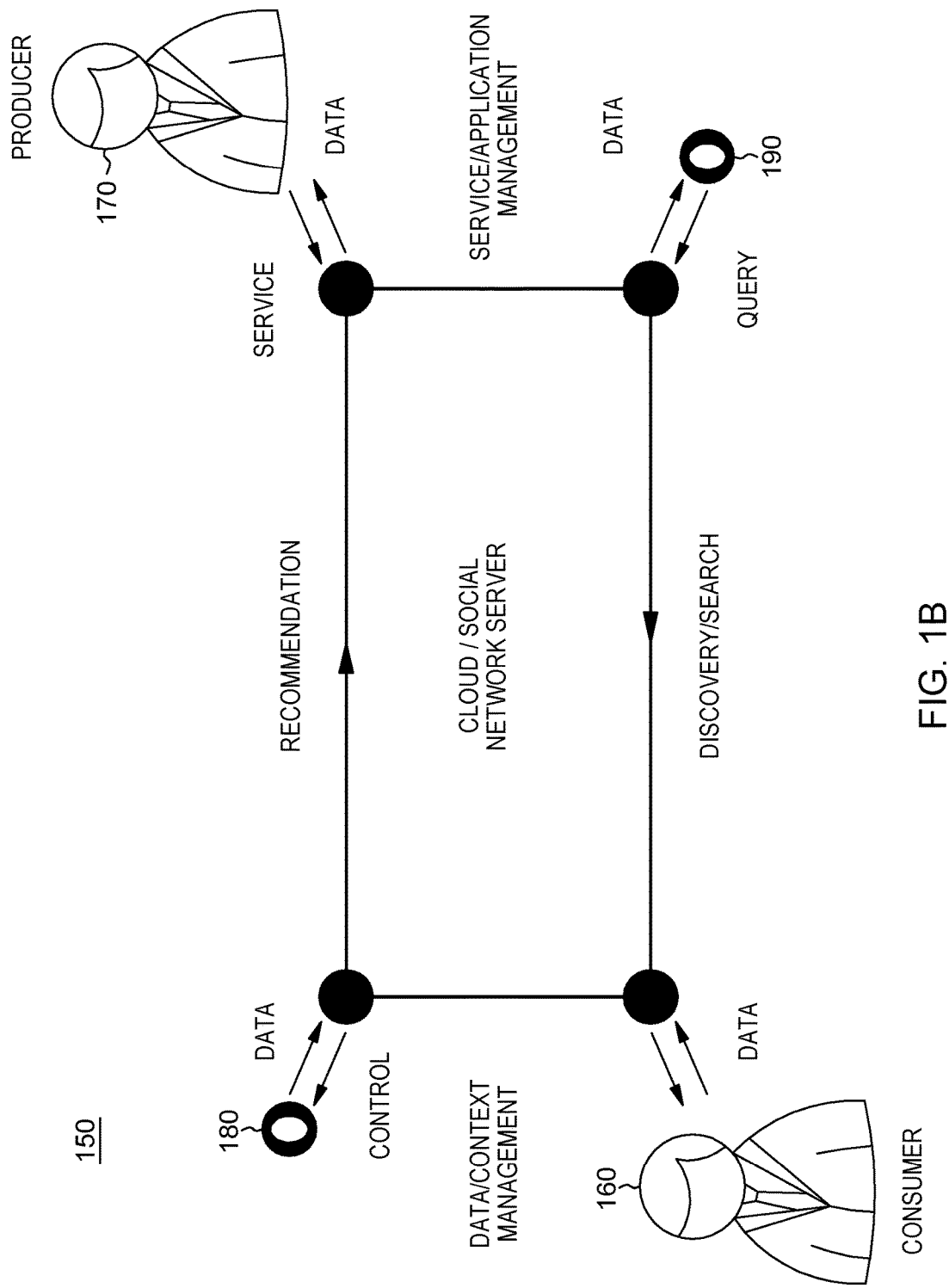

FIG. 1B depicts conceptually the emergent behavior in I-o-T where things work together in a social way. For example, FIG. 1B shows a networked communications system 150, e.g., cloud/social network server facilitating typical interactions between individuals, e.g., consumer entities 160 and producer entities 170, where, for example, a consumer 160 may generate queries that are communicated over system 150 to a web-based service which may receive the query and invoke another entity, e.g., a producer entity 170, to generate a response or perform a service via normal communications networking and web-service/social-media based protocols. FIG. 1B further depicts device entities, i.e., I-o-T devices 180, 190 that are configured according to embodiments described herein, to communicate with each other in a similar way, e.g., communicating messages in the form of free-form natural language (NL). That is, each I-o-T device 180, 190 may be configured with a small set of social behaviors—owner, follow, post, friend, like, join group—and enables scaling to billions of devices. By enabling messages to consist of free-form natural language (NL), behavior is further enables that is not pre-programmed. Thus, rather than using structured API calls between devices, the I-o-T devices can now talk to each other in a more natural language driven way, which enables more integrated behavior of humans and things interacting in a social way, e.g., to perform activities including, but not limited to: search and discovery and recommendations, data management, service/application management.

Figure 2:
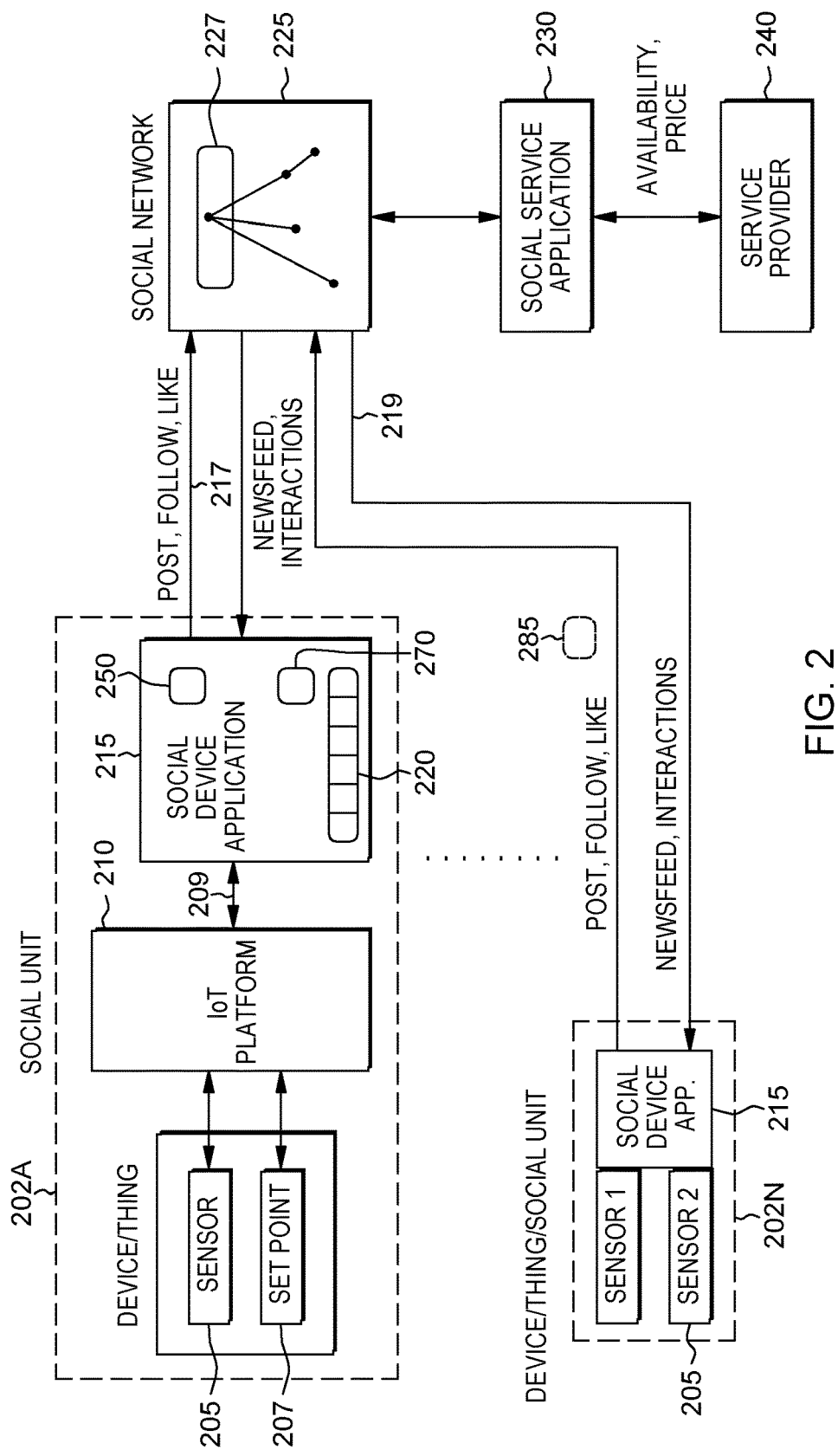
FIG. 2 depicts a system 200 in which the present invention is employed according to an embodiment.

In one aspect, there is provided a system, computer program product and methods providing an increased cognitive ability for I-o-T devices to form relationships with other I-o-T devices and/or send natural language ("NL") messages between devices. With increased cognitive computing capability at the I-o-T device, including the ability to perform natural language processing (NLP), message filtering and message generation, I-o-T devices may increasingly form relationships, accept/decline relationships, and take actions based on messaging. With the ability to perform NL device-to-device communication, the systems and methods herein enable the formation of social relationships, including the filtering/addressing of messages based on relationships and resulting in the performing of physical actions. For example, a "socially" enabled home heating system could be switched on or activated in response to a post from the homeowner that they were feeling cold, or that they were about to start a journey home. Such a post could also be made by another device such as the owner's car. Many physical actions could be enabled in this way including, but not limited to: turning on and off home appliances such as heating or air conditioning systems, tea kettles and coffee makers, clothes dryers, lighting, driveway gates, etc;

FIG. 2 depicts a system 200 in which the present invention is employed. As shown, the system 200 includes plural physical devices 202A, . . . , 202N, each in communication with a social network 225, which may be an existing social network e.g., IBM Connections V.6.0, or a new social network that includes a communications/network infrastructure. Each physical device is referred to herein as a "social unit" device 202A, . . . , 202N, each having a set of components that collectively provide the units with cognitive capabilities for exhibiting social behavior. The components include devices including, but not limited to: one or more low level hardware sensors/actuators 205 and an AI module in the form of a social device application 215 that configures the social unit and the low level hardware devices with a set of social behaviors for interacting socially, including, but not limited to: instructions for reading free form natural language (NL) (text/voice) messages; based on these messages performing one or more actions defined by a developer; initiating social relationships with other devices; accepting or declining relationships initiated by other devices; ranking the importance of read messages based on the relationships; addressing NL text messages to other social units or groups of social units based on the relationships; and in response to messages and/or readings from a set of sensors, generating NL messages. In one embodiment, the social device application 215 may reside in the cloud or on the social unit device itself.

For example, as shown in FIG. 2, social device application 215 may be configured to provide the social behavior intelligence on top of the low-level sensor hardware device by enabling a translation of sensor measurement data, or translate information that an actuator may need to be triggered, into a social type of communication 217 representing a social behavior such as, e.g., post, follow, like. For example, social unit devices 202A, . . . , 202N may be configured with a social behavior, including, but not limited to: a "follow" behavior for enabling first and second devices to follow another device, a "post" behavior for enabling the first device and the second device to post a message to a network location for receipt by other devices, or "like" behavior for enabling the first device or the second device to indicate an approval (like) of another device or friend. Social unit devices 202A, . . . , 202N may be further configured to receive free-form NL text messages including, but not limited to: interactions, newsfeed information, etc. For example, in a publication/subscription social network model, social unit devices may "follow", i.e., subscribe to feeds 219 of data (or receive inbound data flow) from another social unit device via the network 225 to obtain all posts or information feeds from the other social unit device that publishes information in NL messages format. For example, groups of devices (e.g., at a home network) may be followers with a social unit device associated with common owner.

In an embodiment, social unit device 202A is shown including an I-o-T platform interface 210 additionally provided for communicating low level hardware device data, e.g., sensor measurement values, for receipt at a more intelligent device on a network or a sensor monitoring platform. It is understood that a social unit device does not necessarily have to be equipped with the I-o-T platform interface devices for communicating low level data as shown in social unit device 202N of FIG. 2. With respect to human-device social interactions, a social unit device 202A, . . . , 202N may implement a speech-to-text technology to capture a social interaction that includes sending/receipt of a human voice.

In an embodiment, the sensors 205 may include any I-o-T sensor device that senses/measures physical quantities, e.g., in an analog value or digital value representation, including, but not limited to: Temperature sensors, Pressure sensors, Water quality sensors, Chemical/smoke and gas sensors, Level sensors, IR sensors, force/load/torque/strain sensors; motion/velocity/displacement/position sensors; and vibration and shock sensors, MEMS (micro-electro-mechanical systems sensors, optical/imaging sensors, electro-magnetic sensors, bio/bio-chemical sensors, and location based sensors (e.g., GPS-based location sensors), etc. These types of sensor devices are configured with a power supply (e.g., batteries, energy harvesting means) (not shown) and communications interface for connecting to the internet via any one or many communications protocols, e.g., wireless, wired, via the I-o-T platform. In an embodiment, a set point 207 may programmed and include any parameter used by the device to control physical behavior such as on/off status or target sensor reading.

In one aspect, the I-o-T platform 210, is a network-based or cloud-based application that receives data (e.g., measurements, data values) from a sensor or actuator device 205 and translates the data from the sensor(s) 205 into useful intelligence that can be processed and/or transmitted to other devices/entities. In one embodiment, the social device application 215 receives and interprets the useful intelligence 209 and transmits, via a communications interface, the useful intelligence to other machines/devices, e.g., for enabling a real-time response over a communications/network infrastructure 225.

In a further embodiment, it should be understood that the devices 205, 210 and 215 may not necessarily be on the same unit nor at a single location, however, may be distributed components the cooperatively interact to provide the I-o-T devices 205 and unit 202A with the corresponding set of social behavior(s).

In the embodiment shown in FIG. 2, each social device application 215 of a social unit 202A, . . . , 202N includes/employs a natural language processing (NLP) Engine 250 so that the low-level hardware devices 205 may communicate with each other through natural language text messages. In one aspect, the text is interpreted by the NLP engine 250 which is configured to analyze text through natural language processing for detecting entities, such as users, and requested items, etc. For example, the NLP engine 250 may be configured to detect locations, and operators/services (e.g., need, have, want, can provide, can transport, etc.) and which may be built up from a relationship extraction engine such as any known relationship extraction engine and a set of keywords specific to a set of devices. In one embodiment, the system may include a relationship extraction engine component 270 to perform the relationship-extraction, or may include a known cloud service. In one embodiment, the NLP engine 250 may also be implemented as a cloud service. A prior art relation-extraction engine may include the alchemyapi available at: http://www.alchemyapi.com/products/alchemylanguage/relation-extraction) or from IBM's Watson Natural Language Understanding service having similar text analytics and natural language processing capabilities.

In one embodiment, the NLP engine 250 can determine if a message is semantically equivalent to one of a known set of messages. For example, the NLP engine (application) provides a capability for the devices to converse using NL by testing an incoming piece of text from a message, and comparing the message amongst a known set of messages or concepts that it is programmed to react to that enable the social device unit to respond accordingly or trigger a particular behavior depending upon the device (e.g., turn up the home heat); and enables developers to program logic for the social unit device by writing scripts to converse in NL formats (e.g., a protocol for devices to converse with each other and to the social network by messages having little pieces of natural language that can be interpreted).

In one embodiment, a social unit device includes a collection of Application Program Interfaces (APIs) that offer text analysis through natural language processing. The set of APIs analyze text to understand its concepts, entities, keywords, and sentiment. These APIs provide text analysis functions that derive semantic information from received content. For example, based upon a sensor reading, there may be generated input text message, HTML, or a public Uniform Resource Locator (URL). The social unit device may receive the generated text message, HTML, or a public URL and is programmed to leverage natural language processing techniques to get a quick high-level understanding of the received content.

Several API's utilized by the social device application 215 of the Social Unit device 202A-202N include, but are not limited to: an API that extract concepts from a message/webpage; a date extraction API that extracts dates from a message/webpage; an entities API for extracting entities from a message/webpage; a feed detection API; a keywords API for extracting keywords; an API for extracting relations; an API for extracting sentiment; and other API's for extracting text, title, linked data, etc.

As further shown in FIG. 2, each of the social unit devices 202A includes a communications interface for communicating within the social network 225, which may be existing, e.g., IBM Connections V.6.0, or any new social media network/platform. The social media network 225 implements a server 227 (a social network server or SNS) providing a communications platform infrastructure that enables messaging between devices, brokering of trust between devices, and the moderating of information flow between devices (e.g., filtering of NL messages) including between social unit devices and other service provider entities. For example, a service provider 240 running an associated social services application 230 may interface with the social network server 227 to provision digital services or other types of services (e.g., an entity that supplies/delivers physical goods). The social services provider entity 240 via application 230 thus, may subscribe to and receive published communications (in a pub/sub model) in the form of NL messages from a social unit device (e.g., having a sensor). The service provider entity 240 may receive published communications from, and respond and provide information to, the publishing social unit device 202A, . . . , 202N, via the SNS 227 and social network 225.

In one embodiment, the SNS 227 keeps and updates a record including the established relationships between social unit devices 202A, . . . , 202N. This record can be stored in a a database associated with the SNS. The SNS 227 is configured to ensure that messages sent by social units are delivered to the correct recipients. In the case of addressed messages (e.g., "to friends of friends") the SNS 227 checks the database of relationships to identify the correct recipients. For public messages, the SNS 227 keeps a record of public messages. A search api is available that enables social unit devices 202A, . . . , 202N to filter public messages based on SN connectivity, keywords, or semantic similarity.

In one example: a sensor or actuator in a car (navigation system) may sense that the car is leaving a current location, and the social device application 215 at the car may communicate over a communications network, e.g., a wireless communications network, a NL status message, e.g., "leaving work", for receipt at the driver's home network location, wherein in response a network connected home heating controller at the home of the driver may automatically raise temperature if needed. In this example, the home heating system device may have an persistent relationship to follow all of the posts by the social unit device at the car (e.g., as a "follower" or based on having a common owner with the social unit device associated with the car sensor). In this case, other devices that are interested in the information of the car/owner whereabouts may subscribe to an information feed/post from the car's or social unit device to automatically perform certain actions. The home heating unit may be pre-programmed with logic to recognize from certain natural language messages a type of response or action to perform.

As another example, a social device application 215 implementing an I-o-T sensor for detecting a coffee supply at a user's home may detect, generate and post a free-form natural language message to the social network 225 to the effect "I am out of coffee" or that the user "is out of beans". That is, in one embodiment, the device to device communications are performed in a "social" way over a communications network. Responsive to the natural language text posting, one or more service provider(s) 240 may collaborate to respond to this request in a manner that follows a protocol similar to protocols in a social network. For example, a coffee provider entity may automatically generate and respond with a natural language text message: "I see you're out of coffee, I can deliver 10 capsules for $1 at 4 PM?" The social device application 215 may receive this NL text message and respond accordingly in a responsive NL text message "Yes, I accept".

Figure 3:
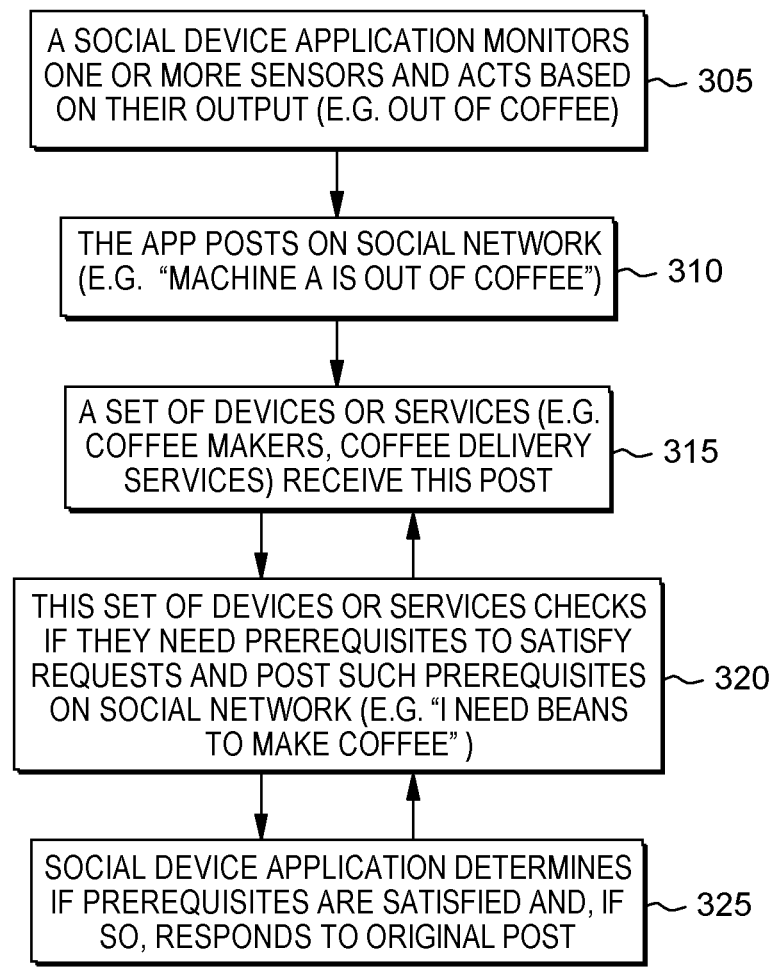
FIG. 3 illustrates an exemplary computer-executed method 300 for cognitive device-to-device interaction based on social networks in accordance with an embodiment.

FIG. 3 illustrates an exemplary computer-executed method 300 for cognitive device-to-device interaction based on social networks in accordance with an embodiment. With regard to block 305 of FIG. 3, the social device application 215 is configured to monitor and detect from one or more sensors, e.g., a level sensor, an amount of an item, and act based on their output (e.g., "out of coffee"). At block 310 of FIG. 3, the social device application 215 is configured to "post" or "publish" on the social media network a corresponding NL text message (e.g., "Machine A is out of coffee"). A further step 315 depicts the receipt of this post by a set of devices or services (e.g. coffee makers, coffee delivery services). Continuing to step 320, the receiving set of devices or services checks if they need prerequisites to satisfy requests and further post such prerequisites on social network. For example, a coffee maker entity may responsively post a message "I need beans to make coffee". Between steps 315/320 there may be messaging iterations between the posting devices and the responding entities.

Finally, continuing at 325, the social device application 215 at the social unit device determines if prerequisites are satisfied and, if so, responds to original post. For example, the coffee maker entity may respond to the social network with a message providing information such as the availability of coffee beans and the price.

In the example depicted in FIG. 3, there may be a "trust" relationship established between the communicating devices. That is, when devices collaborate with other devices to provide a service, the success of this collaboration may be recorded by the SNS 227. Devices can publicize positive interactions by initiating a "friend" relationship and/or "liking" the other devices or service. The provisioning of social behavior to the social unit device enables assessment of a reputation or trustworthiness of devices which facilitates finding suitable collaborations in the future. Thus, the establishment of a trust mechanism strengthens security and dramatically decreases the search space for social unit device interactions.

Social unit devices in the system can then perform an evaluation, e.g., by weighing a "trust" vs. "cost" in deciding which other devices to collaborate with or form social connections with. Thus, the SNS server is a component for the establishing of trust through interactions and the sharing of this trust through social connections.

In one embodiment, the system 200 provides the ability to address messages to other social units or groups of social units based on social relationships: When a device sends a message, it can be either addressed to a URL of a specific other device (e.g., by a name or an identifier (ID)), or it can be broadcast with privacy settings that are defined in terms of the social network, e.g., "only readable by friends of friends". The social network server 225 delivers messages to the message queues of targeted recipients. In a second embodiment, no SNS is needed, and message recipients can be limited through the use of public/private keys.

In a further embodiment, the system 200 accommodates the sending and receiving of public messages: That is, a social device 202A can mark a message as "public". In one embodiment, public messages may be delivered via a publication/subscription (pub/sub) model. In a second embodiment, public messages may be stored on the social network server 227 and can be queried by other social unit devices.

In a further embodiment, the system 200 of FIG. 2 accommodates the filtering of messages. For example, social unit devices 202A, . . . , 202N may further be equipped with a message queue 220, which queue may be populated with all messages delivered by the social network server. In one embodiment, the social network server filters useful messages based on network connectivity: for example, filtering messages to show only messages from "friends". Thus, for example, when a social unit device posts a message to the social network site, this message can be given a privacy setting to indicate who can view the message, e.g., only the "owner" of the device, the friends of the device, friends of friends, or followers.

In a further embodiment, the system 200 is configurable to initiate social relationships with other social unit devices. That is, social unit devices 202A, . . . , 202N can form relationships with each other and with people. In one embodiment, relationships are primarily used for purposes of: message filtering and trust management. Examples of such relationships may include, but are not limited to: "owner", "friend", "follower", "like", "join group". In one embodiment, certain such relationships (such as "owner") can be created by authorized users; certain such relationships (such as "friend") can be created by mutual agreement; and certain such relationships (such as "follower") can be created by any user/device.

In one embodiment, a relationship request is a structured message structured in accordance with the following:

<(relationship type, social unit ID 1, social unit ID 2)> where a relationship type is, for example, a "follower" or "friend" between first and second entities communicating via their respective social devices, e.g., the social unit device ID 1 or social unit device ID 2. Another type of device messaging format may include a JavaScript Object Notation (JSON) format/structure. In one embodiment, these structured messages can be sent directly from a first social unit device to a second social unit device over the communications/social network 225. Alternatively, SU generated messages can be received at the social network server 227 which is configured to forward the messages to a target social unit device(s) based on the type of message. These relationships are then stored by updating a database or memory storage device associated with the social unit devices.

In a further embodiment, these messages are sent to the social network server (SNS) device 227 and relationships are stored by the SNS in an associated database (not shown).

In a further embodiment, logic is implemented at the social unit device and/or at the SNS 227 providing a behavior for initiating a social relationships between social device units or other devices that include, but are not limited to, examples such as:

"follow all devices with the same owner",
"follow all friends of friends that are the same type as me"
"follow all devices in the same city that are of a given type".

In a further embodiment, the system 200 implements logic at the social unit device providing a behavior for accepting or declining relationships initiated by other devices: The logic for accepting or declining a relationship depends on the specific application in question. For example, a device may accept friend requests only from devices with the same owner. Or devices only from "friend".

In a further embodiment, the system 200 implements logic at the social unit device 202A, . . . , 202N providing a behavior for ranking the importance of read messages based on the tracked relationships: For example, social unit devices can determine the trustworthiness of other devices by their relationship (e.g., friend/owner) and/or by recommendations (e.g., likes by friends or others social connections).

Figure 4:
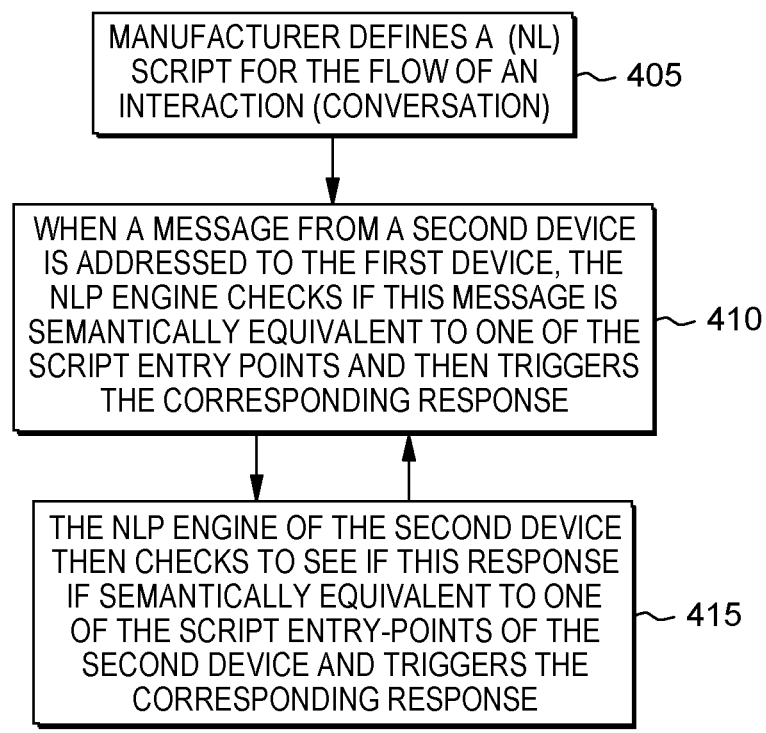
FIG. 4 illustrates a conceptual flow diagram of an architecture 400 that enables developers/manufacturers to focus on semantic interactions, instead of syntactic interactions, in one embodiment.

FIG. 4 illustrates a conceptual flow of an architecture 400 that enables developers/manufacturers to focus on semantic interactions, instead of syntactic interactions. In the method 400, at 405, the manufacturer of the low-level hardware sensor/actuator device 205 has defined and implemented a (NL) script for the flow of an interaction for social unit devices to converse in NL and form relationships in a cognitive way with each other and other device entities, e.g., service providers. For example, upon receipt of certain measurement data by a sensor device 205, the NPL engine and social device application may be triggered to respond, i.e., communicate to another device, a pre-defined message. The social unit devices then may send NL messages according to the defined script at address locations (e.g., URLs) of specific social unit device(s) for receiving the message, or a network location(s) for publishing the message. As indicated at 410, when a message from a second social unit device is addressed to the first social unit device, the NLP engine 250 of the first social unit device checks if this message is semantically equivalent to one of the script entry points and then triggers a corresponding response. The corresponding response may be a message communicated back to the second social unit device. At 415, FIG. 4, the NLP engine of the second device then checks to see if this response if semantically equivalent to one of the script entry-points of the second device and triggers another corresponding response.

Thus, the script based NL messaging feature of FIG. 4 enables the communication and reading of free form NL text and/or voice messages and based on the free form NL text, perform one or more actions. For NLP interaction between devices to scale, the communications/social network platform is provided as generalizable NLP interactions as shown in FIG. 4.

FIGS. 5A-5D depicts a methodology 500 implemented at the social device application 215 of a social unit device 202A, . . . , 202N of FIG. 2 in a distributed or centralized social network platform. In one embodiment, social device application continually monitors/detects a receipt of data and/or messages, and at 505, a determination is made as to whether sensor (or actuator) data is received at the social device application. If sensor device data has been received, the method proceeds to 508 where the received sensor data is analyzed and particular intelligence determined. Then, based on the intelligence determined from analyzing the received sensor data, social device application 215 determines a pre-determined response NL message from a script at 510. In one embodiment, at 515, based on the NL response, the application determines whether to send the message as a public message or private message to a target device(s), and at 520, the social unit device is configured to determine a forwarding network address (e.g., a URL) and forwards the NL message to a target device(s) or publishes the NL message in the social network 225. The process proceeds back to step 505 for detecting further receipt of data or messages.

Figure 5A:
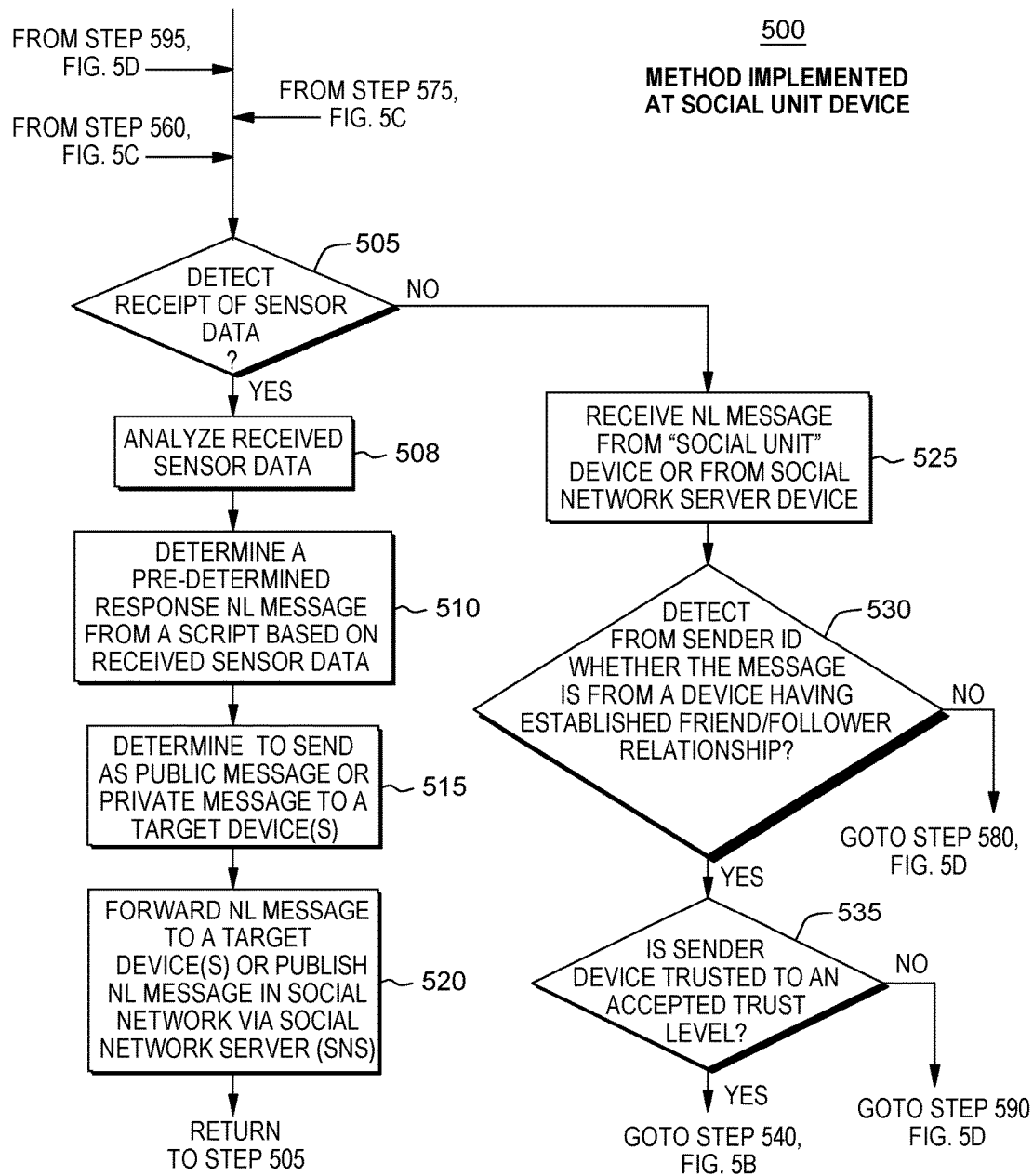
FIGS. 5A-5D depicts a methodology 500 implemented at a social unit device of FIG. 2 according to an embodiment.
Figure 5B:
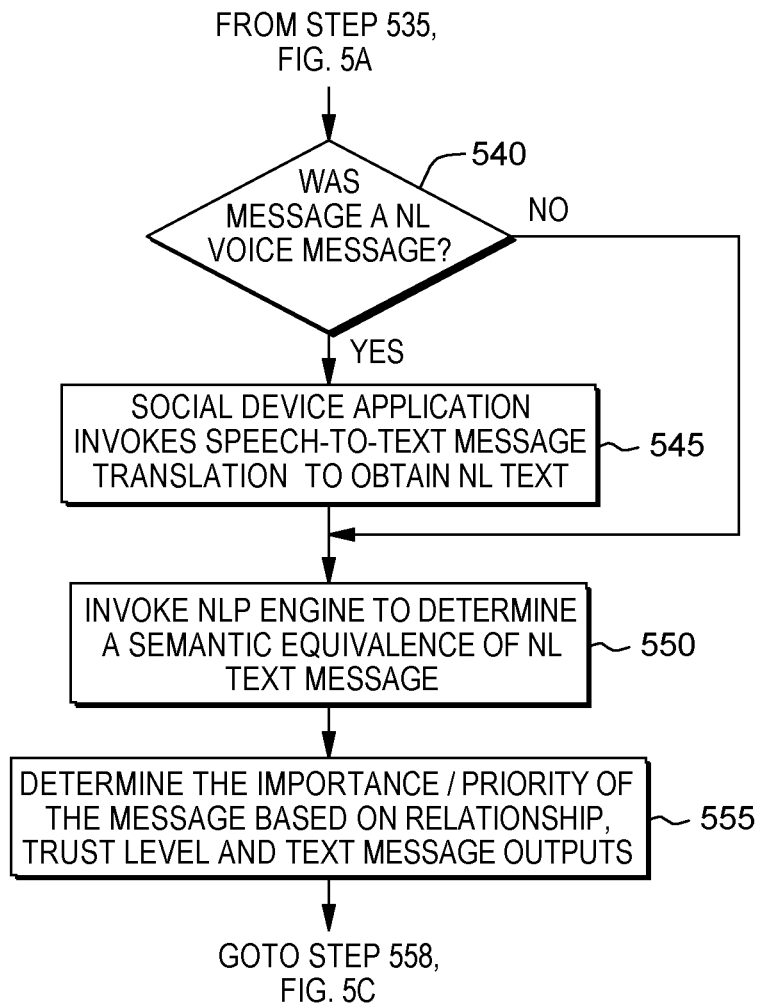

Returning to 505, if no sensor data has been received, then at 525 a NL message (voice or text) from another Social Unit device (SU) or from the Social Network Server (SNS) 227 has been received via a network interface and buffered in a memory device (not shown) for analysis. Then, at the receiving SU, a determination is made at 530 as to whether a sender ID of the received message is from a sender device having an already established (i.e., persisting) friend/follower relationship. If the sender ID of the received message indicates a device having an established friend/follower relationship, then at 535, based on the sender ID of the received message, a further determination is made as to whether the sender device is trusted to an accepted trust level, i.e., has had prior favorable collaborative transactions, or relate to family or friends or is a common owner, etc. If, at 535, it is determined that the sender device is trusted to an accepted trust level, then the process proceeds to step 540, FIG. 5B, where a determination is made as to whether a NL voice message has been received via a network interface and buffered in a memory device (not shown) for analysis. If a voice message is not received, then a regular NL text message has been received, and the process proceeds to step 550, FIG. 5B. If a voice message is detected as being received at 540, then the process proceeds to 545, where the social device application invokes a speech-to-text message translator (not shown) to generate a corresponding text message for interpretation. Then, the process will proceed to step 550. Whether a translated speech-to-text message or NL text message is received, based on the NL text, at 550, FIG. 5B, the social device application invokes the Natural Language Processing (NLP) engine 250 to interpret and/or determine a semantic equivalent of the received message, and the process proceeds to step 555, FIG. 5B where a ranking value is assigned to the message based on outputs of block 530, 535 (FIG. 5A) and block 550 (FIG. 5B). That is, the SU device application assigns a ranking value to the received message based on the relationship and trust level of the sending device and the content of text message. For example, a message may be very highly ranked if it is from a commonly-owned device and/or is a highly trusted source, and may be ranked lower if it is from an untrusted device or a device having no relationship to the SU. The received and ranked text message may be temporarily stored in a queue 220 at the SU device that is populated with all messages received from the social network server. The process then proceeds to block 558, FIG. 5C where the highest ranked message stored in the queue is selected for further processing which continues at 560, FIG. 5C.

Figure 5C:
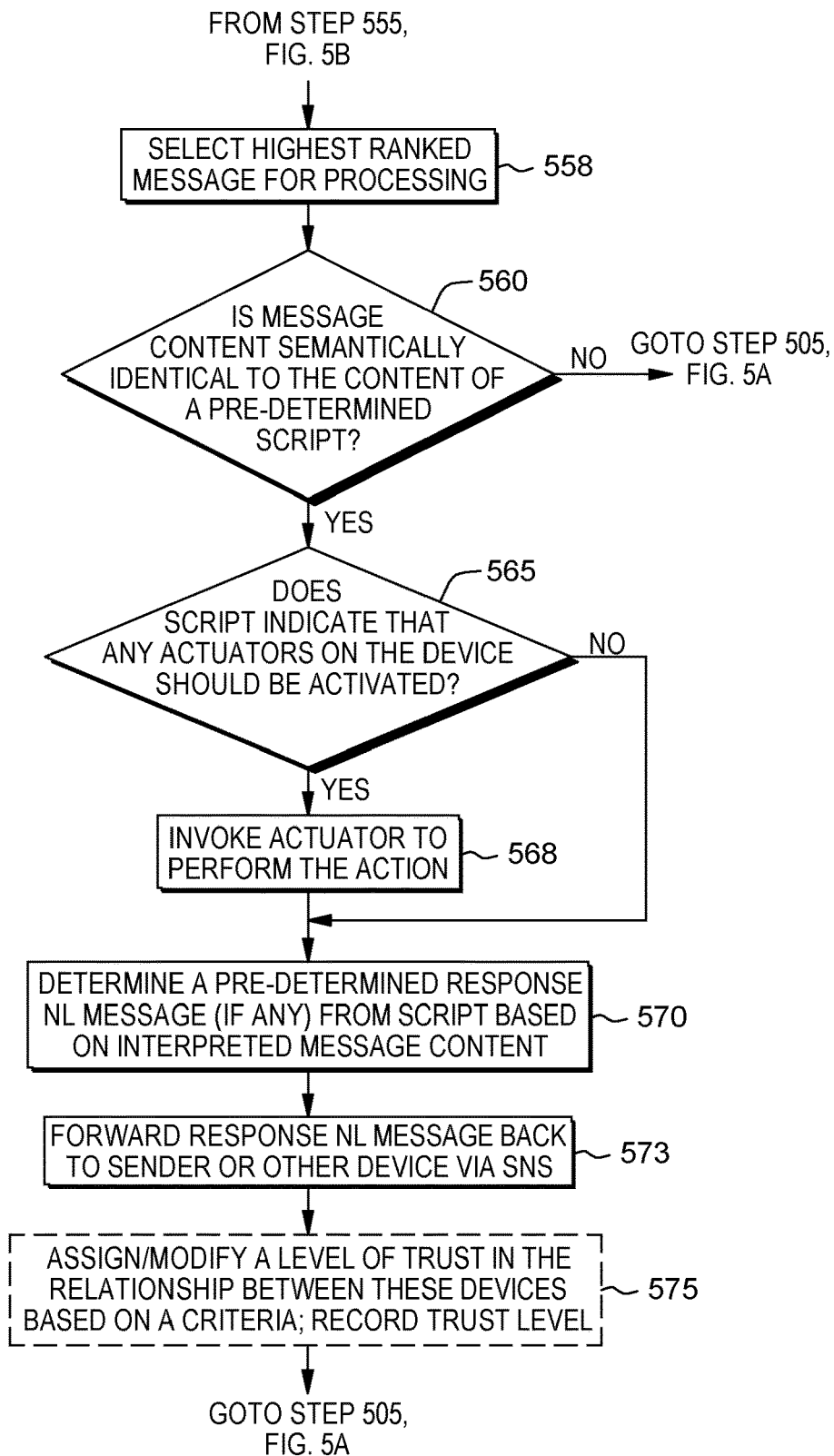
Figure 5D:
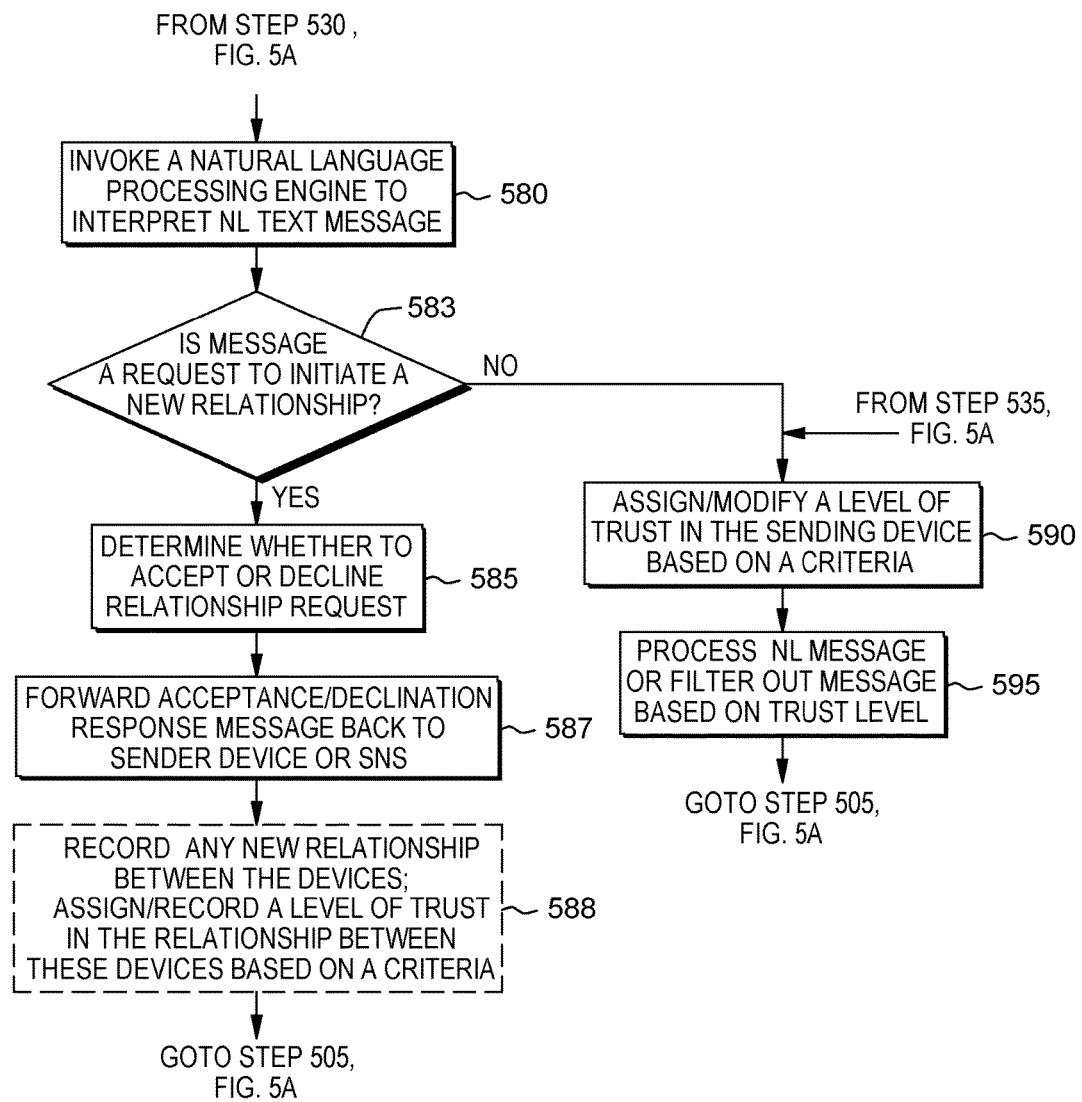

Otherwise, returning to 530, FIG. 5A, if it is determined based on the sender ID, that the received message is from a sender device having no established friend/follower relationship, then the process proceeds to step 580, FIG. 5D where the social device application invokes the Natural Language Processing (NLP) engine 250 to interpret and/or determine a semantic equivalent of the received message. Then, continuing to 583, FIG. 5D, a determination is made as to whether the interpreted message is a request from an entity to initiate a new relationship, e.g., become a friend with or follower of, that social unit device. If the message is determined to be a request to initiate a relationship, then the process proceeds to 585 where the social device application may determine whether to accept or decline the relationship request. In one embodiment, there may be involved human interaction in making this determination for the social unit device, or the device may be configured to accept/decline relationships based on certain criteria. For example, a SU device could be configured to automatically accept relationship requests from friends of friends. In any event, at 587, FIG. 5D, the social unit device generates and forwards an acceptance/declination response message back to the network address (e.g., a URL) associated with the sender device or SNS for forwarding the response to the requestor (sending device). The process continues to step 588 where the social device (and the SNS) may record, at the SU device, the new relationship established between the SU and the sending device. Further, at 588 the social unit device may further assign a level of trust in the new relationship between these devices based on a criterion, and record that level of trust. In one embodiment, the criteria may relate to an amount of past successes of collaborations, or a publicized number of positive interactions through social connections. The process returns to 505, FIG. 5A for monitoring receipt of new messages/data.

Otherwise, returning to 583, FIG. 5D, if it is determined that the received NL message is not a request to initiate a new relationship, then the process proceeds to 590, FIG. 5D where the receiving SU device may further assign/modify a level of trust to the sending device (based on a criteria) and at 595, process the NL message or filter out message based on the trust level. The process returns to 505, FIG. 5A for monitoring receipt of new messages/data.

Returning to step 535, FIG. 5A, based on the sender ID of the received message, if it is determined that the sender device is not trusted to an accepted trust level, e.g., has had unfavorable prior interaction, or has not yet built a level of trust with the SU device, then the process proceeds directly to step 590, FIG. 5D where the receiving SU device may further assign/modify a level of trust to the sending device (based on a criteria) and at 595, process the NL message or filter out message based on the trust level.

Turning to step 558, FIG. 5C, there is selected a current or stored message with the highest ranking from the message queue. Then, at 560, FIG. 5C, having determined that the NL message is from a trusted device or entity having an existing friend or follower relationship, and having invoked the NLP engine to determine a semantically equivalent version of the message, a determination is made as to whether the received NL message includes content that is semantically identical to content of a pre-determined script. If it is determined that the received NL message includes content that is not semantically identical with content of a pre-determined script, then the process returns to step 505, FIG. 5A where a default message may be returned to the sending device or the SNS. If it is determined that the received NL message includes content that is semantically identical with content of a pre-determined script, then the process proceeds to 565 where a further determination is made as to whether the pre-determined script indicates that any actuators on the device be activated. If it is determined at 565 that the script does not indicate that any actuators on the device be actuated, the process continues to 570, FIG. 5C. Otherwise, if it is determined at 565 that the script indicates actuators on the device to be actuated, then at 568, the actuator is invoked to perform the action and the process continues to step 570. Whether received from step 565 or step 568, at step 570, FIG. 5C, the social device application determines a pre-determined response NL message from the script based on interpreted message content and proceeds to 573 where the social unit device is configured to determine a forwarding network address and forwards the response NL message to a target device(s) or publish the response NL message via the social network 225. As the SU device 202A, . . . , 202N tracks the quality of the interactions to assess trust, the process continues at 575, where the social device application may further assign/modify a level of trust in the relationship between these devices based on a criteria and record that level of trust for the sending device. The criteria may relate to an amount of past successes of collaborations, or a publicized number of positive interactions through social connections. Then the process returns to 505, FIG. 5A.

With respect to Social Network Server (SNS) functionality, the SNS 227 may be configured to implement social network functionality for existing social network messaging as known in the art. In an embodiment, the SNS captures and records the relationships established among SU devices. In one embodiment, the SNS 227 is configured for receiving and forwarding messages to/among social unit devices and/or other devices based on the message. For example, the SNS 227 may make a determination as to whether a received message is a private NL message (e.g., as opposed to a "public" NL message). Determining if a message is private and who the intended recipients are is based on structured metadata generated by the message. If the message is detected as a private message, the SNS 227 may forward the message to the target device. Example messages sent by a SU device that may be received at the server for processing might be structured as:

{from: "Social unit A" to: [<ID of SU B>, <ID of SU C>] content: "message text"} or

{from: "Social unit A" to: public content: <message text>}

A further message type generated by the SU device may be:

{from: <ID of Social unit A>to: "group: all friends" content: <message text>}

In receiving this message type, the SNS use existing relationships it has recorded to determine recipients for this message.

In one embodiment, if it is determined at the SNS 227 that the received message is a "public" NL message, then the public message is recorded, and the SNS 227 determines a forwarding network address to forward/post public message to a social network location for direct access by one or more social unit devices or service providers. The one or more social unit devices or service providers may invoke a search API to filter public messages based on social network connectivity, keywords, or semantic similarity, e.g., wherein the API may map a set of keywords included in a NL message to a specific device.

Thus, to achieve emergent behavior in the I-o-T, in the embodiments herein, "things" will work together in a social way, i.e., by providing a small set of social behaviors, e.g., follow, post, like, that will enable scaling to billions of I-o-T devices. By enabling messages to consist of free-form natural language (NL), the methods enable behavior that is not pre-programmed. Security, and privacy is further maintained in this social network of things, by limiting access to message based on the relationships that devices form with each other.

Figure 6:
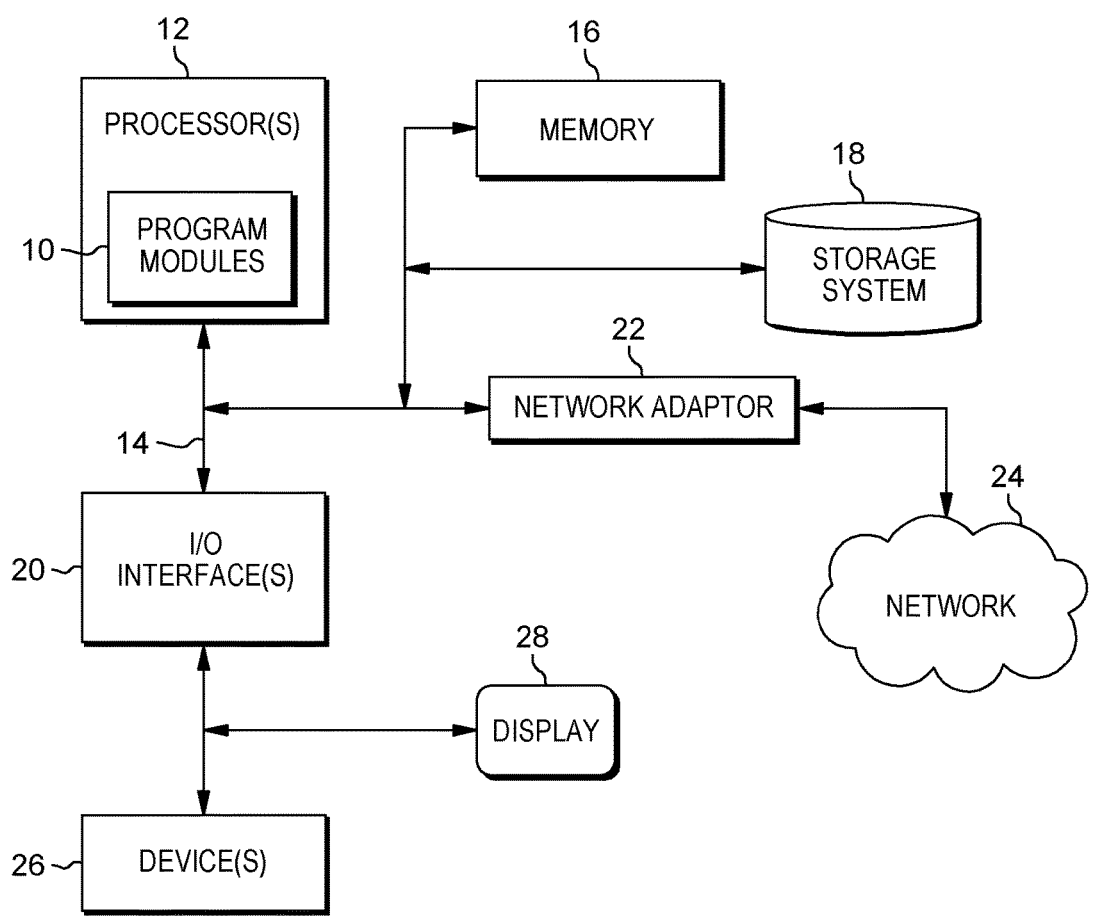
FIG. 6 illustrates an example computing system in accordance with an embodiment.

FIG. 6 illustrates an example computing system in accordance with the present invention that may provide the services and functions associated with the social network server and/or social unit device. It is to be understood that the computer system depicted is only one example of a suitable processing system and is not intended to suggest any limitation as to the scope of use or functionality of embodiments of the present invention. For example, the system shown may be operational with numerous other general-purpose or special-purpose computing system environments or configurations. Examples of well-known computing systems, environments, and/or configurations that may be suitable for use with the system shown in FIG. 6 may include, but are not limited to, personal computer systems, server computer systems, thin clients, thick clients, handheld or laptop devices, multiprocessor systems, microprocessorbased systems, set top boxes, programmable consumer electronics, network PCs, minicomputer systems, mainframe computer systems, and distributed cloud computing environments that include any of the above systems or devices, and the like.

In some embodiments, the computer system may be described in the general context of computer system executable instructions, embodied as program modules stored in memory 16, being executed by the computer system. Generally, program modules may include routines, programs, objects, components, logic, data structures, and so on that perform particular tasks and/or implement particular input data and/or data types in accordance with the methods described in FIGS. 5A-5D).

The components of the computer system may include, but are not limited to, one or more processors or processing units 12, a memory 16, and a bus 14 that operably couples various system components, including memory 16 to processor 12. In some embodiments, the processor 12 may execute one or more modules 10 that are loaded from memory 16, where the program module(s) embody software (program instructions at the social device application or social network server) that cause the processor to perform one or more method embodiments of the present invention. In some embodiments, module 10 may be programmed into the integrated circuits of the processor 12, loaded from memory 16, storage device 18, network 24 and/or combinations thereof.

Bus 14 may represent one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

The computer system may include a variety of computer system readable media. Such media may be any available media that is accessible by computer system, and it may include both volatile and non-volatile media, removable and non-removable media.

Memory 16 (sometimes referred to as system memory) can include computer readable media in the form of volatile memory, such as random access memory (RAM), cache memory an/or other forms. Computer system may further include other removable/non-removable, volatile/non-volatile computer system storage media. By way of example only, storage system 18 can be provided for reading from and writing to a non-removable, non-volatile magnetic media (e.g., a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 14 by one or more data media interfaces.

The computer system may also communicate with one or more external devices 26 such as a keyboard, a pointing device, a display 28, etc.; one or more devices that enable a user to interact with the computer system; and/or any devices (e.g., network card, modem, etc.) that enable the computer system to communicate with one or more other computing devices. Such communication can occur via Input/Output (I/O) interfaces 20.

Still yet, the computer system can communicate with one or more networks 24 such as a local area network (LAN), a general wide area network (WAN), and/or a public network (e.g., the Internet) via network adapter 22. As depicted, network adapter 22 communicates with the other components of computer system via bus 14. It should be understood that although not shown, other hardware and/or software components could be used in conjunction with the computer system. Examples include, but are not limited to: microcode, device drivers, redundant processing units, external disk drive arrays, RAID systems, tape drives, and data archival storage systems, etc.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowcharts and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. The corresponding structures, materials, acts, and equivalents of all elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A system for providing a service comprising:
a communications network infrastructure supporting communication of messages,
a social network processing server comprising a hardware processor configured to receive messages from one or more social processing units configured to communicate messages over said communications network infrastructure, at least one said social processing unit having a hardware processor configured to receive sensor data from a sensor device or from an actuator device associated with an appliance to be provisioned with a product for use thereof and generating in response to received sensor data, a first message in a natural language (NL) format according to a predefined script;
the at least one social processing unit further configured to send said generated first NL message, over a communications network, for receipt at the social network processing server, and the social network processing server comprising a hardware processor configured to:
track identified relationships amongst said first social processing unit and said other service providers;
deliver said first NL message to said other service provider entities for review based on identified relationship between the first social processing unit and said service provider entities, a service providing entity configured to read NL text messages and generate response messaging indicating terms to satisfy a provisioning of said product for said appliance;
the first social processing unit further configured to receive a response message communicated from said service providing entity, said response message being generated in a natural language text format at said service providing entity to indicate ability to provision said appliance, said first social processing unit invoking a natural language processor to interpret said text of said response message, and based on said interpretation, sending a reply message to said service provider to initiate said action to provision said appliance with said product.

2. The communications platform of claim 1, wherein the hardware processor at said social processing unit is further configured to:
 analyze a text from a received response message by invoking a natural language processing engine for detecting entities, said entities comprising names, addresses, user IDs and items, locations, relationships, and services.

3. The communications platform of claim 2, wherein the hardware processor at said social processing unit if further configured to:
 perform an action responsive to receiving said NL response message, said action performed comprising:
 generating a further NL message; and
 communicating said generated further NL message for receipt at said one or more social processing units or other devices via the communication network.

4. The communications platform of claim 2, wherein the hardware processor at said social processing unit is further configured to:
 initiate a relationship with another one or more social processing units by sending out a NL message to a target social processing unit via the communications network.

5. The communications platform of claim 4, wherein the hardware processor at said target social processing unit is further configured to:
 accept or decline a relationships initiated by said first social processing unit.

6. The communications platform of claim 2, wherein said communications network infrastructure comprises:
 a social network processing server configured to:
 receive NL messages sent from said first or one or more social processing units;
 read NL messages received;
 identify, from said read NL messages, a relationship established between one or more social processing units;
 track identified relationships amongst said first and one or more social processing units; and
 store the tracked relationships in a memory storage device associated with the social network processing server.

7. The communications platform of claim 6, wherein said social processing unit is further configured to:
 determine from a read message an importance of the NL messages sent from another social processing unit based on said identified relationship; and
 rank the read message based on its determined importance at the social processing unit.

8. The communications platform of claim 6, wherein said social processing unit is further configured to:
 determine a trust level amongst one or more social processing units having established relationships, and
 track a determined trust level for each tracked relationship.

9. The communications platform of claim 6, wherein said social network processing server is further configured to:
 address NL text messages for communication to other social processing units or groups of social processing units based on said relationship types extracted from a read message.

10. The communications platform of claim 8, wherein said social network processing server is further configured to:
 filter received NL messages read based on the relationships established among social processing units and other devices, said filtering including limiting access to a NL message by a social processing unit.

* * * * *